US005367580A

United States Patent [19]

Kumagai

[11] Patent Number: 5,367,580

[45] Date of Patent: * Nov. 22, 1994

[54] METHOD AND SYSTEM FOR ESTABLISHING A COINCIDENCE BETWEEN TWO IMAGES

[75] Inventor: Ryohei Kumagai, Tokyo, Japan

[73] Assignee: Ezel, Inc., Tokyo, Japan

[ * ] Notice: The portion of the term of this patent subsequent to Nov. 17, 2009 has been disclaimed.

[21] Appl. No.: 126,742

[22] Filed: Sep. 27, 1993

Related U.S. Application Data

[60] Continuation of Ser. No. 903,472, Jun. 24, 1992, abandoned, which is a division of Ser. No. 646,375, Jan. 28, 1991, Pat. No. 5,159,646.

[30] Foreign Application Priority Data

Jan. 29, 1990 [JP] Japan ........ 2-18663

[51] Int. Cl.[5] ........ G06K 9/32

[52] U.S. Cl. ........ 382/46; 382/44; 382/45

[58] Field of Search ........ 382/44, 45, 46; 356/375; 250/491.1

[56] References Cited

U.S. PATENT DOCUMENTS

| | | | |
|---|---|---|---|
| 4,567,609 | 1/1986 | Metcalf | 382/9 |
| 4,593,406 | 6/1986 | Stone | 382/44 |
| 4,641,355 | 2/1987 | Hongo et al. | 382/34 |
| 4,700,401 | 10/1987 | Masatsuga et al. | 382/34 |
| 4,748,676 | 5/1988 | Miyagawa et al. | 382/46 |
| 4,876,732 | 10/1989 | Miyagawa et al. | 382/41 |
| 4,878,248 | 10/1989 | Shyu et al. | 382/9 |
| 4,922,543 | 5/1990 | Ahlbom et al. | 382/48 |
| 4,956,870 | 9/1990 | Hara | 382/30 |
| 5,164,997 | 11/1992 | Kumagai | 382/46 |

FOREIGN PATENT DOCUMENTS

| | | | |
|---|---|---|---|
| 0123272 | 7/1983 | Japan | 382/65 |
| 59-62980 | 4/1984 | Japan | 382/46 |
| 0062983 | 4/1984 | Japan | 382/30 |
| 0100988 | 6/1984 | Japan | 382/65 |
| 0235278 | 11/1985 | Japan | 382/65 |
| 61-272608 | 12/1986 | Japan | 382/45 |

OTHER PUBLICATIONS

Rosenfeld et al., "Digital Picture Processing", vol. 2, 1982, pp. 240–243.

Tanaka et al., "Automatic Verification of Seal-Imprint", (1984) National Convention (Record) of Information Processing Society of Japan, pp. 541–542, 1978.

Fan et al., "Automatic Chinese Seal Identification", Computer Vision, Graphics, and Image Processing 25, pp.311–330, 1984.

Mieno, Hiroshi, "An Experiment of Identification of Seal Impression by Pattern Matching", Journal of Information Processing, vol. 16, No. 3, pp. 205–211, 1975.

Ueda, "Comparison of Results of an Automatic Seal-Imprint Verification Experiment and Verification (List continued on next page.)

*Primary Examiner*—David K. Moore
*Assistant Examiner*—Andrew W. Johns
*Attorney, Agent, or Firm*—Cushman, Darby & Cushman

[57] ABSTRACT

An image verification system for verifying whether a sample image corresponds to a reference image registered beforehand. A relationship between the sample and the reference image is stored when the sample image corresponds to the reference image. The sample image is compared with the reference image by verifying the sample one and the reference according to the relationship between characteristic values of the sample and reference.

5 Claims, 7 Drawing Sheets

OTHER PUBLICATIONS

Ability of a Band Clerk", The Transactions of the Institute of Electronics, Information and Communication Engineers, vol. J70, No. 7, pp. 1374–1382, 1987.

Yoda, et al. "Selecting Objects by a Rotational Pattern Matching Method", Transaction of Instrument and Control Engineers, vol. 10, No. 3, pp. 284–289, 1974.

Kaneko et al. "Seal Impression Positioning by Correlating Marginal Densities about the Centroid", The Transaction of the Institute of Electronics and Communication Engineers of Japan, Section J. vol. 67, No. 1, pp. 133–140, 1984.

Kaneko, Toru, "Positioning of Seal Impressions Using Marginal Densitites about the Centroid", The Transaction of the Institute of Electronics and Communication Engineers of Japan, Section J. vol. 67, No. 1, pp. 133–140, 1984.

Kaneko, Toru, "Automatic Identification of Seal Impressions", The Journal of the Institute of Electronics and Communication Engineers of Japan, pp. 168–170, Feb., 1986.

Iwase et al, "A Method for Identification of Seal Impressions", National Convention (Record) of the Institute of Electronics and Communication Engineers of Japan, No. 1556, pp. 6–109, 1984.

Ueda et al. "Experiments and Analysis of Automatic Verification of Seal–Impressions", National Conference (Record) on Information and Systems, the Institute of Electronics and Communication Engineers of Japan, PRL83–19, pp. 65–72, 1983.

Atsumi et al. "Seal Imprint Verification System", Oki Review, No. 122, pp. 47–52, 1984.

Morishita et al. "Normalization of Location of Seal–Imprint Pattern by Matching Partial Area", (1984) National Convention (Record) of Information Processing Society of Japan, pp. 967–968, 1984.

Kaneko, Toru, "Examination of Algorithm of Pattern Positioning of Seal–Imprint", (1983) National Conference on Information and Systems, the Institute of Electronics and Communication Engineers of Japan, pp. 1–451 and 1–452, 1983.

Takeda et al. "A Position Matching Method of Print of Seal by Using Point Symmetric Region of Outer Space", National Convention (Record) of the Information Processing Society of Japan, vol. 29, No. 2, pp. 1107–1108, 1984.

Morishita et al. "An Experiment of Normalization of Patern Location of Seal–Imprint Verification", (1983) National Convention (Record) of the Institute of Electronics and Communication Engineers of Japan, pp. 5–368, 1983.

Maeda et al. "Image Verification Method and the Evaluation Experiment", (1983) National Convention (Record) of the Institute of Electronics and Communication Engineers of Japan, pp. 5–370, 1983.

FIG.6 (a)
FIG.6 (b)
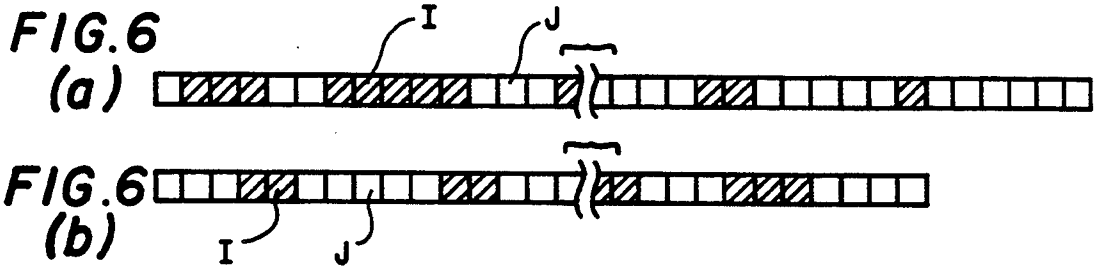
FIG.7 (a)
FIG.7 (b)
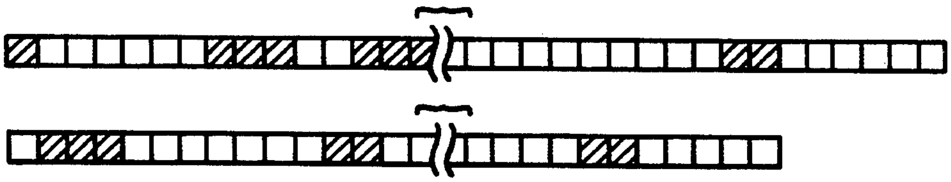
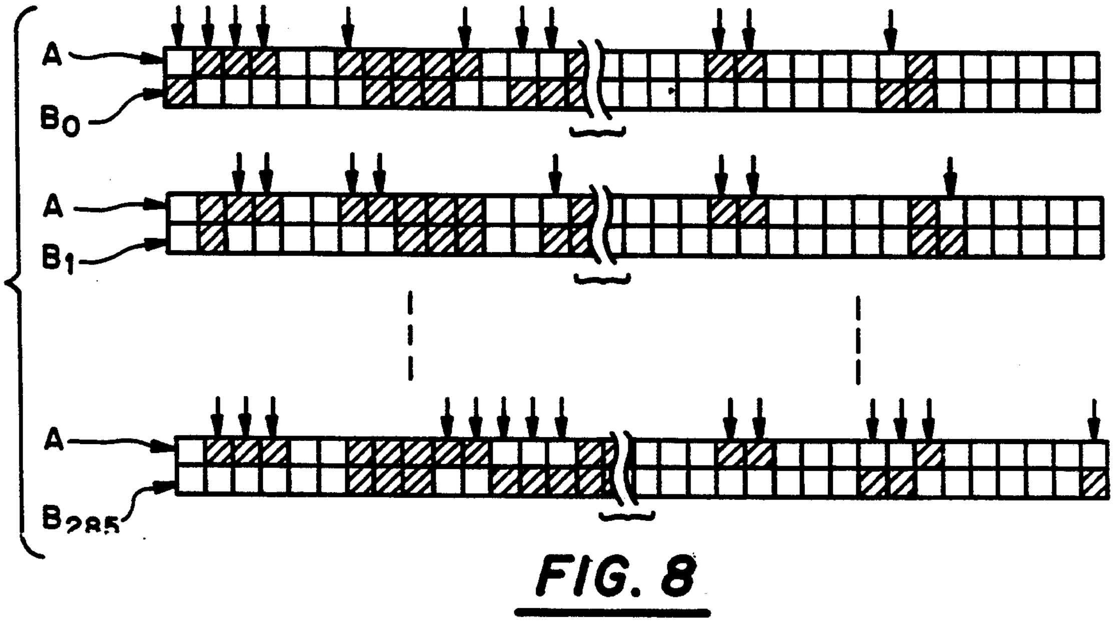
FIG. 8

METHOD AND SYSTEM FOR ESTABLISHING A COINCIDENCE BETWEEN TWO IMAGES

This is a continuation of application Ser. No. 07/903,472, filed on Jun. 24, 1992, which was abandoned upon the filling hereof, which in turn, is a divisional of application Ser. No. 07/646,375, field Jan. 28, 1991, now U.S. Pat. No. 5,159,646.

FIELD OF THE INVENTION

The present invention relates to a verification system for sampling a seal-imprint, and comparing against a registered seal-imprint in a seal-imprint verification system, for example.

BACKGROUND OF THE INVENTION

Conventionally, for instance in a financial institution, automatic seal-imprint verification is executed by a computer in order to judge if a customer's stamp is the same as the one registered beforehand. Whether the seal-imprint currently stamped (that is, the sample seal-imprint) corresponds to the registered one has been judged by so-called template matching. Namely, judgment is made by comparing all the pixels between the sample seal-imprint and the registered one, and the sample one is recognized to be corresponding to the registered one when the identification ratio exceeds a certain value.

SUMMARY OF THE INVENTION

The face of a seal-imprint changes, however, according to the way in which the sealing is carried out. Therefore, it is not always to conclude that the sample seal-imprint and the registered one do not correspond, even when there is a low identification ratio between them. In such a case of a low identification ratio, a human needs to manually judge again. Such a case often happens so that a conventional system is insufficient for labor saving.

The present invention is invented to provide an image verification system to judge precisely image verification and reduce the frequency of manual judgment.

An image verification system according to the present invention includes an image verification system for verifying a sample seal-imprint and a standard image registered beforehand; a method for memorizing a mutual relationship between a sample and a standard image in the case of the sample image to be corresponding to the standard image; and a method for judging if the sample image corresponds to the standard image by verifying the sample one and the standard one according to their mutual relationship between characteristics values of the sample one and the standard one.

BRIEF DESCRIPTION OF THE DRAWINGS

FIG. 6(*a*) shows pixels along the outside circle of registered seal-imprint.

FIG. 6(*b*) shows pixels along the inside circle of registered seal-imprint.

FIG. 7(*a*) shows pixels along the outside circle of sample seal-imprint.

FIG. 7(*b*) shows pixels along the inside circle of sample seal-imprint.

FIG. 8 is a diagram to overlap pixel data of sample seal-imprint by shifting 1 pixel on that of registered one.

FIG. 9(*b*) shows parallel movement of sample seal-imprint in right and left direction on registered seal-imprint.

PREFERRED EMBODIMENT OF THE PRESENT INVENTION

Hereinafter, an embodiment of the lighting system according to the present invention is described with referrence to the attached drawings. The present invention is applied to a seal-imprint verification system in the embodiment.

Figure 2:
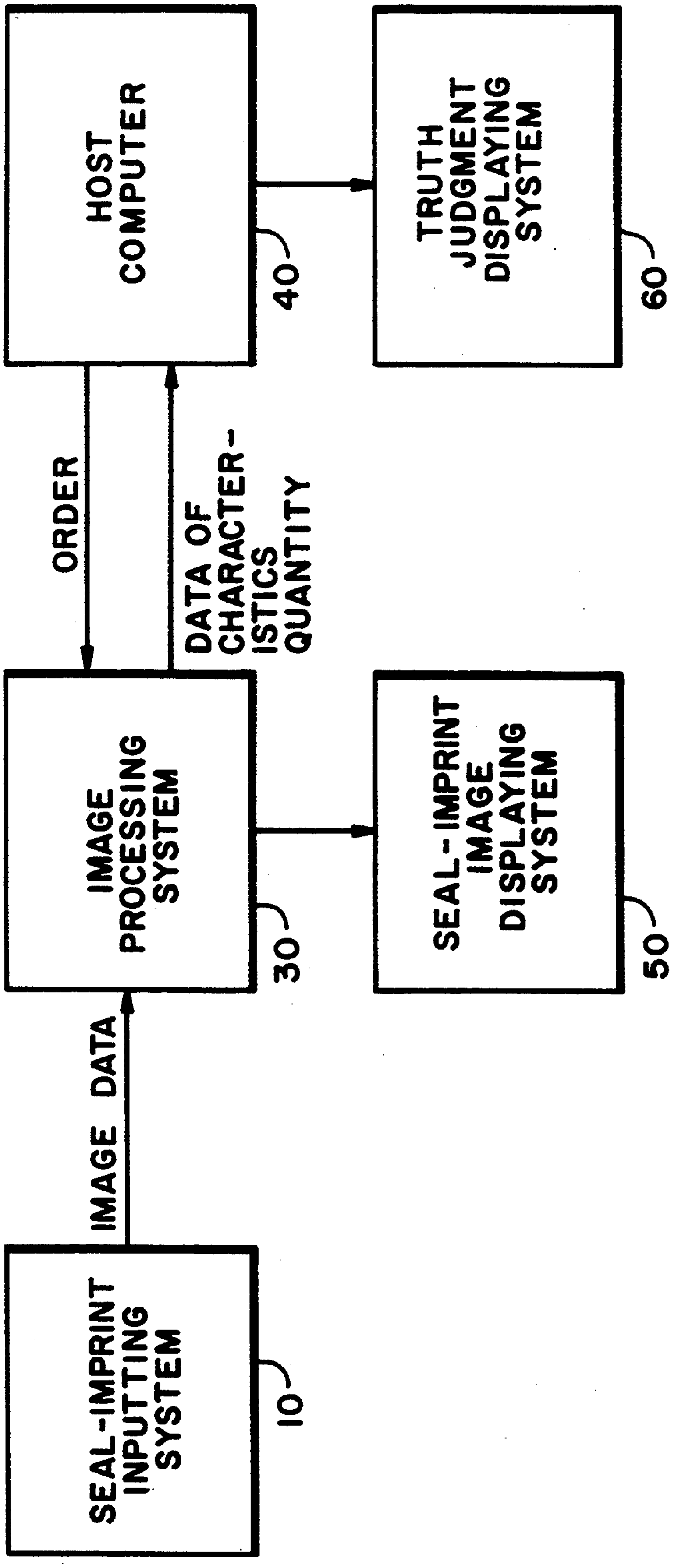
FIG. 2 shows a block diagram of outline structure of a seal-imprint verification system applied the present invention.

FIG. 2 shows the structure of an outline of seal-imprint verification system. It comprises seal-imprint input system 10, image processing system 30, host computer 40, seal-imprint image display system 50 and truth judgment system 60.

Seal-imprint input system 10 photographs the sample seal-imprint. The photographed image data is transmitted to image processing system 30. The characteristic value of the seal-imprint is calculated (seal-imprint area, for example) by performing various image processing operations in image processing system 30. Image processing system 30 works according to the commands provided by host computer 40 and outputs characteristic value data of seal-imprint to host computer 40. Host computer 40 controls the whole of the present system. Simultaneously, it evaluates the characteristic value from image processing system 30 and determines whether the seal-imprint agrees with the registered one or not. Seal-imprint display system 50 comprises a CRT connected to image processing system 30 which displays a seal-imprint. Truth judgment system 60 comprises a CRT connected to host computer 40 which displays the result of judgment if a seal-imprint agrees with the registered one or not.

Figure 3:
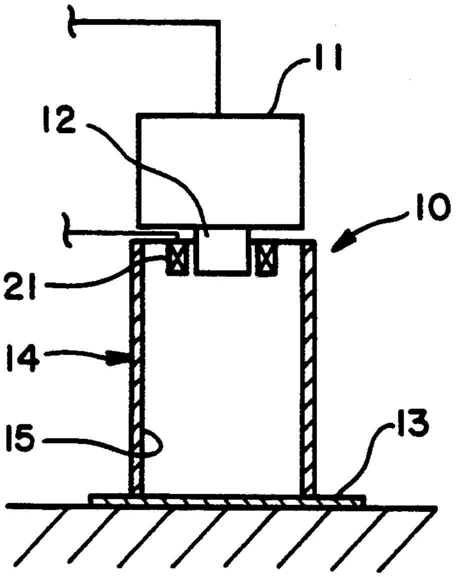
FIG. 3 shows a sectioned diagram of lighting system.
Figure 4:
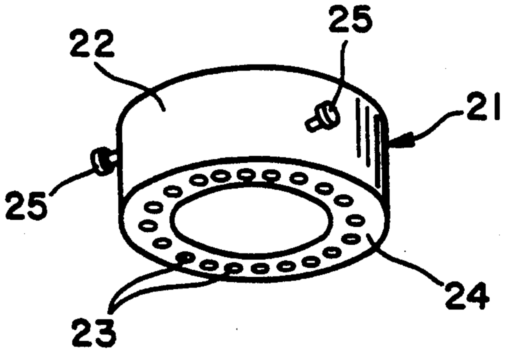
FIG. 4 shows a diagram of irradiating structure from diagonal angle.

Seal-imprint input system 10 comprises a CCD camera 11 as shown in FIG. 3 whose lens is received to mirror tube 12 which runs downward from the main body. CCD camera 11 is confronted by paper 13 on which the seal is imprinted. CCD camera 11 can move parallel to paper 13 and turnaround in the center of the lens. Lens-barrel 12 includes cylindrical irradiation mechanism 21 which comprises a large number of optical fibers 23 as shown in FIG. 4. Optical fiber 23 is connected to light source (not indicated) which emits light by direct current such as a halogen lamp.

Cylindrical light shielding material 14 is settled between camera 11 and paper 13. Light shield material 14 is placed on paper 13, whose upper edge is close to the body of camera 11, so as to minimize irradiation by light from outside.

An inner surface of light-shielding material such as aluminum foil is covered by film 15 which reflects light.

FIG. 4 shows the structure of irradiation mechanism 21 in detail. Irradiation mechanism 21 comprises a large number of optical fibers 23 in circular support material 22: these optical fibers 23 are arranged in a circle, in the center of lens-barrel 12. Blue filter 24, which is transparent to light and formed of material such as cellophane, is put in the center of lens on the proximal part of each optical fiber 23, that is the bottom part of support material 22. Filter 24 is transparent to blue light to maximize the contrast between seal-imprint and background paper, since a seal-imprint to be photographed is vermilion. Support material 22 is fitted to lens-barrel 12 of camera 11 by screws 25.

In this way, the lighting system in the present invention comprises a circular irradiation mechanism 21 surrounding the lens of camera 11 and light-shield material 14 controlling irradiation of light from outside. Irradiating mechanism 21 is constructed to obtain a clear seal-imprint by irradiating light to paper 13 evenly and irradiating blue light through blue cellophane (translucent filter) 24. It prevents ambient light from entering by its light shield material and is constructed to irradiate more evenly to seal-imprint by reflecting film 15. Therefore, it is possible to photograph more clearly and accurately an imprint sealed on paper 13: and precision of seal-imprint can be improved as a consequence.

Figure 1:
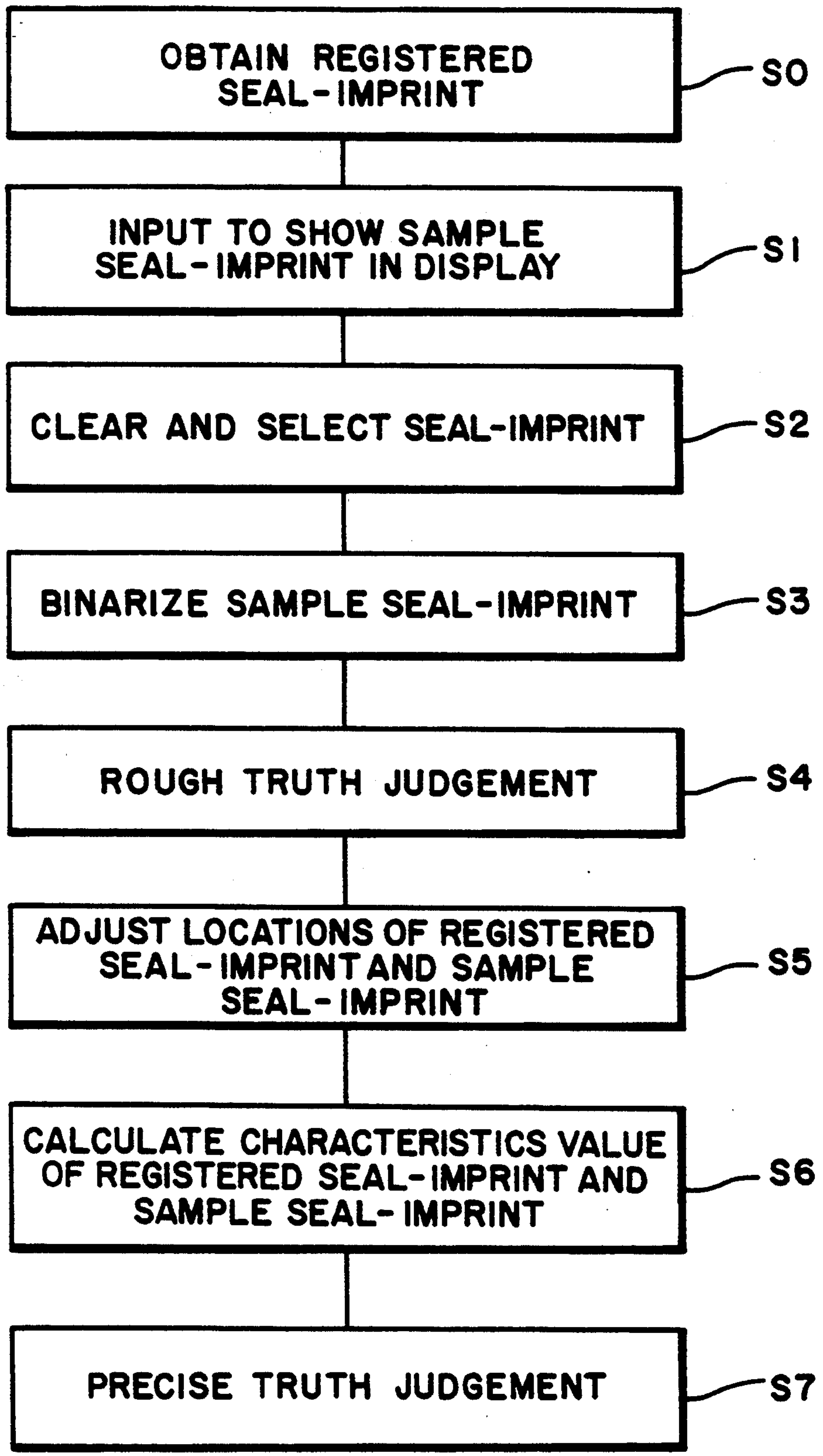
FIG. 1 is a diagram to show the process for verifying seal-imprints in the first embodiment of the present invention.

FIG. 1 shows an outline of the process of seal-imprint verification. The outline is explained first below.

In step S0, a registered imprint is obtained. It is obtained by photographing the sealed imprint by CCD camera 11: the method is the same as in step S1, S2, S3 and S5 described later. In step S1, the seal-imprint is input to display for comparing with the registered one. That is, the sealed imprint is photographed on paper by CCD camera 11, and the seal-imprint is displayed on CRT of seal-imprint display system 50. On step S2, seal-imprint is extracted by erasing the background and the noise in the sample seal imprint. Step S3 binarizes sample seal-imprint to convert a monochrome gray-level image into a black and white image.

Steps from S4 to S6 compare the registered image and sample image. Step S4 judges roughly if a sample seal-imprint is the same as a registered one from the size and the number of pixels of the seal-imprint. When the sample seal-imprint is judged to be different from the registered one, seal-imprint verification is concluded based on this judgment. When they are judged to be roughly the same, the sample seal-imprint is placed upon the registered one by rotation or parallel movement of the sample one. Calculating characteristic values of the registered and the sample seal-imprint is done in step S6, to judge the truth of the sample in detail according to these characteristic values. Characteristics value here means the ratio of registered to sample seal-imprint, identification ratio, blur ratio and faint, scratchy ratio. The area ratio, identification ratio, blue ratio, and faint, scratchy ratio are defined later.

The processing in steps S0 to S7 is explained in detail herein.

The processing in step S0 is described later because it is the same as in step S1, S2, S3 and S5 for sample seal-imprint to obtain exact registered seal-imprint with least blur or faint, scratchy part. It is provided that registered seal-imprint is obtained already in i) to vii) below.

I) Processing in step S1

Sample seal-imprint is photographed by CCD camera 11 with high contrast between the sample and paper by irradiating blue light, as explained referring to FIGS. 3 and 4. The seal-imprint obtained in this way is input to image processing system 30, which executes an A/D conversion, and displays on the CRT of seal-imprint display system 50. The seal is displayed in reverse contrast conversely, so that is seal-imprint is white and the background is black in order to facilitate observation by human eyes on the CRT.

Since the ability to receive light of the CCD changes according to time, tolerance may happen in the image of seal-imprint with only one photograph. Therefore, the present embodiment uses 32 times of photographing for a seal-imprint in order to prevent the tolerance. At the same time, an accumulating addition is performed on the seal-imprint with 32 levels of brightnesses (densities) in each pixel in image processing system 30. A seal-imprint with gray-level is obtained by these steps.

II) Processing in step S2

The paper on which the seal is imprinted may include noise such as spots or the like, which are not parts of the desired image of the seal-imprint obtained in step S1. Step S2 performs smoothing by replacing the mean brightness of each pixel in a 3×3 area for example into the brightness of center pixel in the area. Consequently, noise in an image becomes more vague. After that, an edge of the seal-imprint is sharpened by an image processing operator, such as a Sobel operator. Here, any method can be used for emphasizing an edge of an image, except Sobel operator is preferred.

The image obtained in this way is binarized after determining a threshold by a discrimination analysis method or some other method. Simultaneously, swelling is performed 5 times for each pixel for each time. In consequence, the characters in the seal-imprint are connected in one line even when blur, faint or scratchy parts are included, and noise also causes the image boundaries to swell and become large. Then the seal-imprint is labeled at every connected diagram. A smaller number is added on the labeling. Therefore, it is presumed that the diagram with the largest number comprises the least seal-imprint, and those with smaller numbers include noise. Only the diagrams with the largest number are left, and the others are erased. Perpendicular and horizontal fillet diameters are calculated in the state and the rough area of seal-imprint is determined according to the fillet diameters.

The parts outside of the area are all judged as background and erased recognizing all of brightness points (pixels) to be noise (that is, brightness is made to be "0").

III) Processing in step S3

The area obtained in step S2 is placed upon the image of the seal-imprint obtained in step S1. That is, the image of the seal-imprint obtained in step S1 is surrounded by the area obtained in step S2: the brightness outside of the area is then "0". Concerning the density distribution in the whole of the image of CRT displaying the seal-imprint image, the ratio of dispersion within a class to that between classes (dispersion ratio) is calculated and the threshold on which dispersion ratio is maximum is calculated (discrimination analysis method). The image of the seal-imprint is binarized using the threshold and converted into black and white colors. Other methods, such as a mode method, can be adapted for threshold determination method.

IV) Processing in step S4

Here, the area of sample seal-imprint and that of the registered seal-imprint are compared and also both maximal diameters are compared. The area is compared by comparing the pixels of the seal-imprint in each image. When there is a lot of difference between the area of the sample seal-imprint and that of the registered one, the sample is judged to be different from registered one and seal-imprint verification is concluded without executing steps S5 to S7. On the other hand, when there is a little difference between them, it is judged that the sample seal-imprint is possibly the same as the registered one, and steps S5 and those after it are executed.

With respect to maximal diameters, a similar judgment is made. That is, when there is a lot of difference between the maximal diameter of the sample seal-imprint and that of the registered one, the sample is judged to be different from the registered one and the seal-imprint verification is concluded without executing the steps after it. When there is a little difference between them, step 5 and thereafter are executed.

The value for judging if there is a lot of difference between the area or between the maximal diameters is decided by the statistical calculation below.

The ratio:

(area of sample seal-imprint)/(area of registered seal-imprint)$\times$100 is calculated for all samples, and the mean value of all samples m and the standard deviation $\sigma$ are calculated. It is settled that the upper limit is $m+3\sigma$ and lower limit is $m-3\sigma$. The coefficient of $\sigma$ can be changed according to the necessity.

The maximal diameter is determined by placing the sample image upon the registered image in CRT, and calculating how many pixels are spread outside of the registered seal-imprint on all samples. Assuming that the maximal value among then is $\alpha$, the maximal diameter of the registered seal-imprint is $\Phi$, and the maximal diameter of sample seal-imprint is $\phi$,$\phi$ adopts $(\Phi+2\alpha)$ as the standard value. When $\phi$ is larger than $(\Phi+2\alpha)$ the sample is judged to be different from the registered one. The coefficient of $\alpha$ can also be changed according to the necessity.

V) Processing in step S5

Figure 5:
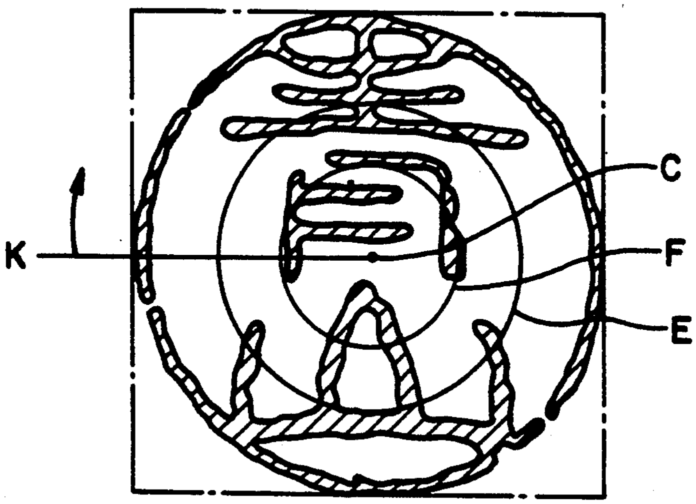
FIG. 5 shows an example of seal-imprint.

First, two concentric circles E and F with arbitrary radii are drawn centered on the fillet center C as shown in FIG. 5. It is necessary that the radius of the outer circle (with the units of pixels) is less than the value calculated below. (maximal length of registered seal-imprint)/2–5 For purposes of explanation, we can assume that the radius of the outside circle E has 50 pixels and the radius of inside circle F has 40 pixels from C (the center of the fillet diameter). Next, by extracting values of pixels of the registered seal-imprint on the inner and outer circle, 1-dimensional spectrums as shown in FIGS. 6(*a*)and 6(*b*) are obtained. FIG. 6 (*a*) is an example of a 1-dimensional spectrum of outside circle E and shows each pixel on the circle, scanning clockwise from standard line K. In the figure, hatched part I shows the existence of the pixel of the registered seal-imprint, and white part J shows a zero value of the pixel of the registered image. In the same way, FIG. 6(*b*) shows a 1-dimensional spectrum of inside circle F.

1-dimensional spectrums of circles of the sample seal-imprint are obtained in the same way: that is, they are obtained after drawing circles with a radius of 50 pixels and 40 pixels centered on the center of fillet diameter of the sample seal-imprint. FIG. 7(*a*) shows an example of 1-dimensional spectrum of the outside circle and FIG. 7(*b*) shows an example of the 1-dimensional spectrum of the inside circle.

In the next step, 1-dimensional spectrum A on the outside circle of the registered seal-imprint and 1-dimensional spectrum B0 on the outside circle of sample seal-imprint are placed upon, and compared with, each other by corresponding pixels as shown in FIG. 8. That is, the spectra A and B0 are compared to determined the parts that are not in agreement by an exclusive-or operation. The pixels not in agreement between spectrums A and B0 are shown in the figure by arrows. The disagreement ratio is calculated by dividing the number of pixels with arrows, that is the number of pixels out of agreement, by the total number of all the pixels in circle E of registered seal-imprint.

After that, spectrum B1 is obtained, which is shifted 1 pixel to the right from the spectrum of sample seal-imprint. The disagreement ratio between spectrum B1 and spectrum A of registered seal-imprint is calculated by the method described above. In the same way, a disagreement ratio between A and the shifted by 1 pixel from the spectrum of sample seal-imprint is obtained sequentially. This operation is executed until shifted spectrum is Bn (n is the number of pixels of a circle) shifted rightwardly.

When n disagreement ratios are obtained, these disagreement ratios are compared with each other and the minimal value is calculated in the next step. The number of shifted pixels at the point of minimal value is converted into rotation angle by the following formula.

Rotation Angle=(Number of Shifted Pixels)$\times$360°/n

The angle for the sample seal-imprint to be rotated is obtained for the comparison with registered seal-imprint. That is, the value calculated by the formula is the rotation angle with the outside circle E as the standard.

Executing the same operation with respect to the inside circle F, the angle to be rotated for the sample seal-imprint is calculated with the inside circle F as the standard.

When some differences occur between the rotation angle obtained from the outside circle and that obtained from the inside circle, the rotation angle with the lower disagreement ratio is adopted and sample seal-imprint is rotated and displaced as the rotation angle. The rotation angle then is presumed to be $\Theta 1$.

After the rotation, the sample seal-imprint is moved in parallel (that is without rotation) until the identification ratio, that is the amount of agreement, between the sample and the registered seal-imprint becomes the maximum. The parallel movement is explained here referring to FIG. 9(*a*), 9(*b*), and FIG. 10.

Figure 9A:
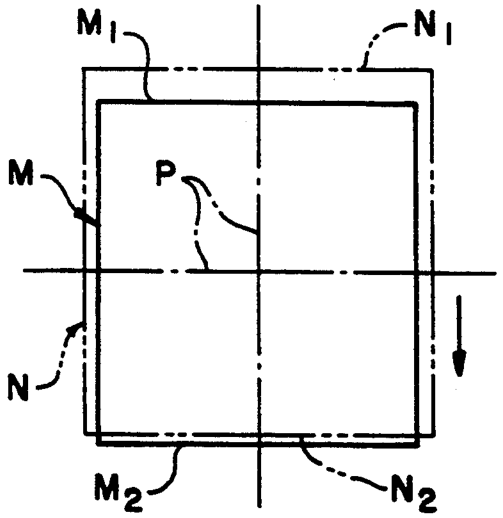
FIG. 9(*a*) shows parallel movement of sample seal-imprint in up and down direction on registered seal-imprint.
Figure 9B:
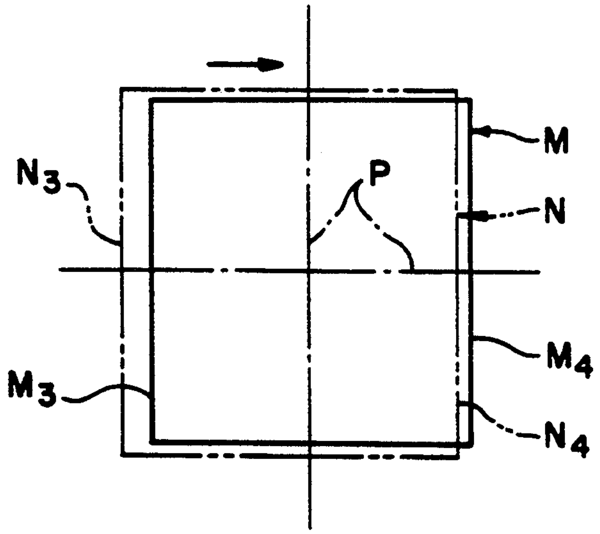

In FIGS. 9(*a*)and 9(*b*), solid line M shows fillet diameters (horizontal and vertical outlines) of the registered seal-imprint. The chain line with one dot P and the chain line with two dots N show horizontal and vertical center lines of the registered seal-imprint, and a fillet diameter of sample seal-imprint, respectively.

As shown in FIG. 9(*a*), the sample seal imprint is placed by taking the position for the center of the upper horizontal fillet diameter of sample seal imprint to be 5 pixels above the upper horizontal fillet diameter of the registered seal-imprint. The sample seal-imprint and the registered one are compared to determine pixels in the two whose valves are identical. The number of pixels are counted. The sample seal-imprint is displaced to the position 3 pixels below the registered one, and the number of pixels which are identical in the sample and stored images is counted. In the same way, by moving sample seal-imprint to the position 3 pixels below, the number of matching pixels is counted; and this kind of processing is repeated until the center of horizontal fillet diameter N2 on the lower side of sample seal-imprint comes 5 pixels below the center of horizontal fillet diameter M2 on the lower side of registered seal-imprint.

Next, as shown in FIG. 9(*b*), the number of pixels of the sample seal-imprint and registered one which are identical to one another is counted by placing the sample seal-imprint on the location that the center of vertical fillet diameter N3 on the left side of sample seal-imprint is 5 pixels left from the center of vertical fillet diameter M3 on left side of registered seal-imprint. The number of pixels which are identical is calculated again by displacing rightward by 3 pixels from the registered seal-imprint. Similarly, displacing the sample seal-imprint rightward by 3 pixels, the number of pixels is that are identical counted until the center of vertical fillet diameter N4 on the right side of sample seal-imprint comes a position rightward by 5 pixels from the center of vertical fillet diameter M4 on the right side of registered seal-imprint. The location "a" of the sample seal-imprint with the maximal identification ratio is obtained among them moved in parallel between upper, below, left and right.

Figure 10:
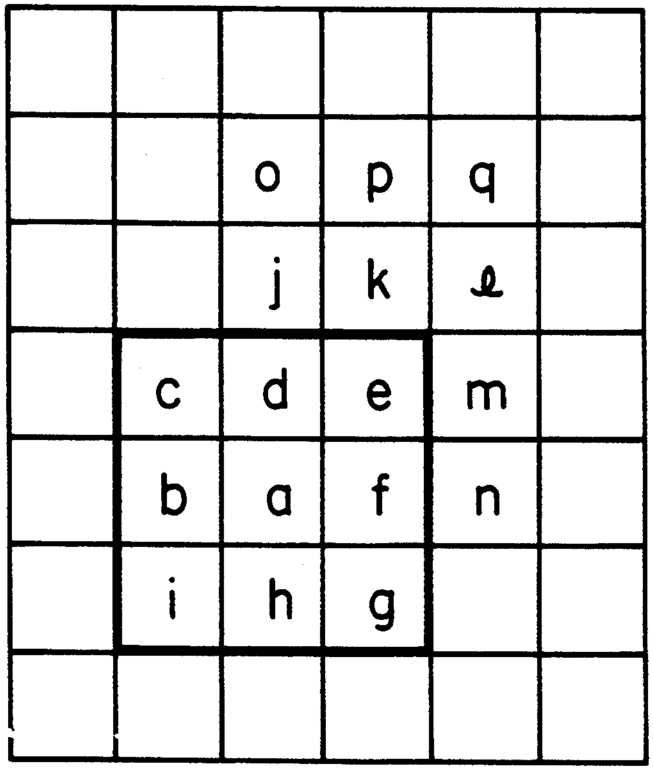
FIG. 10 shows 3×3 area for searching the location with the maximum identification ratio between sample seal-imprint and registered one.

After that, as shown in FIG. 10, the sample seal-imprint is moved with respect to 8 pixels in area Q which is the neighborhood of 1 pixel around in the center of "a" with the highest identification ratio, and the identification ratio between the pixels in the sample seal-imprint and the registered one on each place are determined.

That is, by moving the whole sample seal-imprint from the location of "a" to "b" by 1 pixel left, the identification ratio between the sample and the registered one is calculated. In the next, moving it from "b" to "c" whose location is 1 pixel above "b", the identification ratio between it and the seal-imprint is calculated. In the same way, the sample seal-imprint is moved to locations "d", "e", "f", "g", "h" and "i" in sequence, and identification ratio at each location is calculated. When the identification ratio at location "a" is the largest among all of identification ratios on location "b" to "i", the parallel movement is concluded.

When there is a location with identification ratio larger than that on location "a" from location "b" to "i", the sample seal-imprint is moved to the location with the largest identification ratio. If "e" is such a place, sample seal-imprint is moved from "j" on 1 pixel neighborhood to "k", "1", "m" and "n" as the center to be "e"; and identification ratio on each location is calculated. When the identification ratio on "e" is larger than any value from that on "j" to "n", parallel movement of sample seal-imprint is concluded on "e".

If "k" has an identification ratio larger than that on "e", the sample seal-imprint is moved from "0" on 1 pixel neighborhood of "k" to "p" and "q" sequentially; simultaneously, the identification ratio on each location is calculated. When the identification ratio on "k" is the most largest among those on "o" to "q", parallel movement is concluded on "k".

When there are some locations with an identification ratio larger than that on "k", the location with the largest one becomes the new center point and the identification ratio on the location of 1 pixel neighborhood is calculated.

Continuing the operations above, the location with the highest identification ratio between the registered and a sample seal-imprint is determined, which concludes moving parallelly. The movement quantity of right or left is provided to be X1, and upper or lower, to be Y1.

After concluding rotation or parallel movement, the movements are repeated again and fine adjustment for positioning is executed. On the fine adjustment, the centers of circles E and F are the center of fillet diagram of registered seal-imprint with respect to a sample seal-imprint. Therefore, the identification ratio between the sample seal-imprint, and registered seal-imprint is calculated by rotating it on the axis of the center of fillet diagram of the registered one. Parallel displacement is calculated from the center. The rotating angle, movement distance in rightward or leftward, and movement distance in upper or lower direction are assumed to be $\theta 2$, X2 and Y2.

The present embodiment calculates 2 kinds of angles and a parallel movement distance by executing rotation and parallel movement twice respectively. Two rotation angles $\theta 1$ and $\theta 2$ are added to the angles above, and the value after the addition is the rotation angle to give to sample seal-imprint finally. Similarly, rightward or leftward parallel movement quantity X1 and X2 are added together, and also, upward or downward parallel movement quantity Y1 and Y2 are added together: these values after the addition are the parallel movement quantities of sample seal-imprint in the right or left direction and upper or lower direction.

The binarized sample seal-imprint obtained in step S3 is placed on the registered one by rotating or moving parallelly as the quantity after addition in below.

$$(\theta 1+\theta 2),\ (X1+X2),\ (Y1+Y2)$$

The processing of rotation and parallel movement of sample seal-imprint is completed once. Consequently, it prevents the generation of error from quantization in minimum by it.

It is possible to place a sample seal-imprint on registered one through the process that i) rotating CCD camera by an angle of $(\theta 1+\theta 2)$ parallelly displacing by a distance of (X1+X2) and (Y1+Y2), or
ii) obtaining new binarized sample by performing from step S1 to step S3.

Errors from quantization are not generated in this case.

It is also possible to place a sample seal-imprint on a registered one through the process below.

i) Rotating CCD camera once by the quantity $\theta 1$; parallel displacing by a distance of X1 and Y1, on the step that $\theta 1$, X1 and Y1 are obtained;
ii) Obtaining the binarized sample seal-imprint by performing steps S1 to S3;
iii) Calculating $\theta 2$ of rotation, X2 and Y2 of parallel movement from the sample obtained in ii); and iv) Obtaining new binarized sample seal-imprint by performing steps from S1 to S3 after moving CCD camera as θ2, X2 and Y2.

Quantization error is not generated in this case, either.

At the stage where a sample seal-imprint is placed on the registered one, the fillet diameter to surround the seal-imprint placed on another is drawn. The fillet diagram is divided equally in three from the top to the bottom and also divided equally in three from the right to the left, that is, divided equally in nine. Both seal-imprints are divided into the nine rectangles. The area ratio between a divided part of the registered seal-imprint and the sample seal-imprint is calculated in every part of the rectangle. When the nine area ratios calculated in this way are within the area ratio used in step S4, the processing goes forward to step S6: when at least one in 9 area ratios is out of the range of area ratios used in step S4, the processing is concluded then. It shows that the processing is performed to check the condition of losses, and the verification is not performed for what with too many losses. Of course, the number of division and the threshold of area ratio in each small part can be changed according to the necessity.

VI) Processing in Step S6

In step S6, characteristic values of the registered seal-imprint and sample one are calculated. The characteristic values include: area ratio to check the characteristics in the general situation of a seal-imprint, identification ratio (master), identification ratio (itself), blur ratio (master), blur ratio (itself), faint and scratchy ratio (master), faint and scratchy ratio (itself), and the coefficient of faint and scratchy ratio on swelling to check in detail the difference of strokes in a character included in a seal-imprint. These are defined as below.

The number of pixels in agreement is "the total number of overlapped pixels when a sample seal-imprint is placed on the registered one"; the number of pixels with blur is "the total number of pixels in sample seal-imprint when a sample seal-imprint is placed on the registered one"; the number of faint and scratchy pixels is "the total number of pixels which do not overlap when a sample seal-imprint is placed on the registered one". The number of the sample seal-imprints and the number of the registered one are assumed to be S and T, respectively.

In the following formula, the values are in "%". "Master" and "itself" in parentheses show "the ratio of the number of pixels with agreement to the number of pixels of registered seal-imprint" and "the ratio of the number of pixels with agreement to the number of pixels of sample seal-imprint", respectively.

Area Ratio = (S/T) × 100
Identification Ratio (master) = (number of pixels with agreement/T) × 100
Identification Ratio (itself) = (number of pixels with agreement/S) × 100
Blur Ratio (master) = (number of blur pixels/T) × 100
Blur Ratio (itself) = (number of blur pixels/S) × 100
Faintness and Scratchiness Ratio (master) = (number of pixels with faintnes and scratchiness/T) × 100
Faintness and Scratchiness Ratio (itself) = (number of pixels with faintnes and scratchiness/S) × 100

The coefficient of swelling, faintness and scratchiness is calculated by the next formula after swelling registered seal-imprint as 1 pixel 8 times and calculating the number of blur pixels included each swelling layer in the state of overlapping the registered seal-imprint and sample 80.

Coefficient of Swelling and Blur in n-th Layer = (number of pixels with agreement + number of blur pixels from swelled first layer to swelled n-th layer)/(number of pixels in sample seal-imprint) × 100 n is from 1 to 8. Swelled and blur coefficient is calculated in each swelled layer from the first to the eighth. (cf. FIG. 11)

VII) Processing in Step S7

When the sample seal-imprint corresponds to the registered one, the states of blur or faintness and scratchiness of the two will be similar if made by a similar way of sealing, that is when the quantity of ink and the pressure to seal are almost the same. Therefore, a certain relationship can be found by gathering seal-imprints with the similar way of sealing and performing statistical processing to each characteristics quantity above.

To execute it, the following steps are carried out.

i) Characteristics values mentioned in step S6 are calculated by performing steps from S1 to S6 concerning to every sample seal-imprint in an enormous number of sample seal-imprints;

ii) Performing clustering (classification in types) to the characteristics value obtained in i) by cluster analysis in 3 directions of Identification Ratio (master and itself) Area Ratio Blur Ratio (master and itself) and Faint, Scratchy Ratio (master and itself), the mean distribution of characteristic values in each cluster, that is the standard data, is obtained.

According to the standard data, it is possible to know that the following data are to be what percent around when the area ratio is 80% considering the clustering: identification ratios (master and itself), blur ratios (master and itself), faint and scratchy ratio (master and itself), characteristic values on swelling blur ratio coefficients from 1 to 8. A sample seal- imprint is judged to correspond to the registered one when the characteristic value is within the certain range: it is not judged to correspond to the registered one when the characteristics value is out of the range.

The present embodiment performs judgment of characteristic values using 3 units, that is, unit 1 which clusters the data between the identification ratios of master and itself into one of predetermined cluster groups, unit 2 which clusters with the data of the area ratio calculated by dividing a sample seal-imprint by the registered one and unit 3 which clusters with the data of blur ratios of master and itself faint and, scratchy ratios of master and itself.

In unit 1, clustering the characteristic values from the data of identification ratios of master and itself, the data of the characteristic values including area ratio, blur ratios of master and itself, faint and scratchy ratios of master and itself, and each swelling blur coefficient from the first layer to the eighth layer are all examined.

In unit 2, clustering the characteristic values from the data of area ratio, the following data of the rest is examined. That is, identification ratios of master and itself, blur ratios of master and itself, faint and scratchy ratios of master and itself, and each swelling blur coefficient from the first to the eighth layer are examined.

In unit 3, clustering the characteristic values from the data of blur ratios of master and itself, faint and scratchy ratios of master and itself, and area ratio, the following data of the rest is examined. That is, area ratio, identification ratios of master and itself, and each swelling blur coefficient from the first to the eighth layer.

Figure 12:
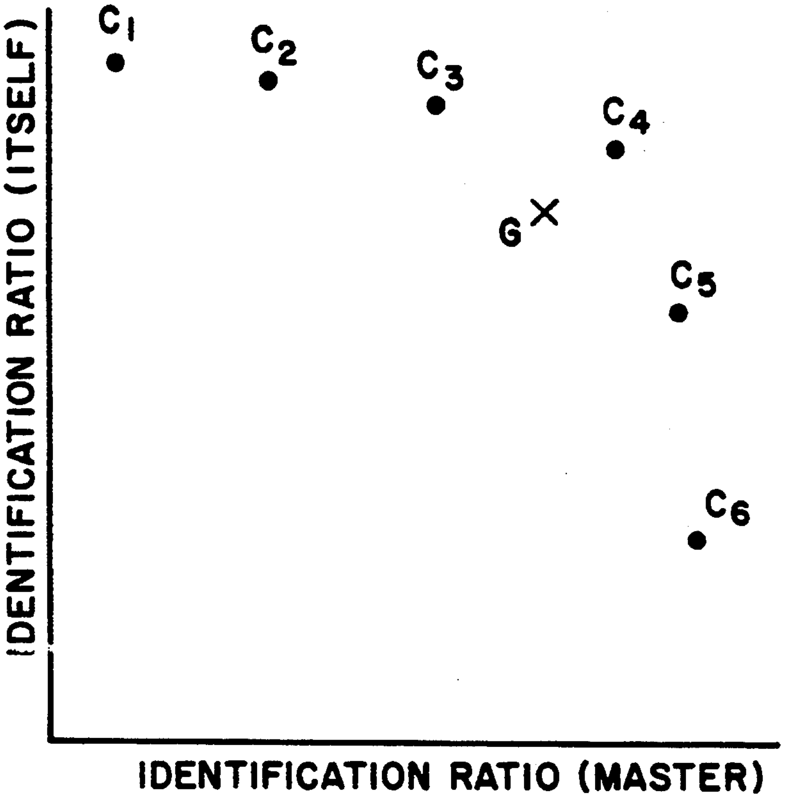
FIG. 12 shows clustering on standard data in identification ratio of sample seal-imprint corresponding to registered one.

First, in unit 1, it is examined to determine which cluster from the relationship of identification ratios of master and itself to which the sample seal-imprint in verification belongs. FIG. 12 generally and approximately shows the standard data. FIG. 12 shows that there is a certain relationship between identifications of master and itself, grouped into 6 clusters from C1 to C6. Assuming that point G shows the relationship between both of identification ratios of the sample seal-imprint in verification, it is examined which mean value in clusters (shown with the black point) is the closest to point G. This can be obtained by calculating the minimum square distance (the minimum value of Euclidian distance). The example in FIG. 12 shows the relationship between the sample seal-imprint and the registered one in verification as being C4, in the fourth cluster, according to the examination above.

Within the cluster to which the relationship is classified (here, the fourth cluster C4, a judgement is made if area ratio, blur ratios (between master and itself), faint and scratchy ratios (master and itself) are within the standard data or not. Here, in the standard data in cluster C4, mean value and standard deviation are assumed to be those in TABLE 1 below.

TABLE 1

| | Mean Value | Standard Deviation |
|---|---|---|
| Area Ratio | 118.6 | 5.0 |
| Blur Ratio (Master) | 21.8 | 3.1 |
| Blur Ratio (Itself) | 18.3 | 2.4 |
| Faint and Scratchy Ratio (Master) | 2.7 | 2.2 |
| Faint and Scratchy Ratio (Itself) | 2.2 | 1.8 |

In the present embodiment, blur ratios and faint and scratchy ratios between the sample seal-imprint and the registered one in verification are judged if they are within the range that 3 times of standard deviation with the mean value in the center or not (that is, it is judged if they are within the range of (mean value)+−3×(-standard deviation)). For example, when area ratio is 122.6, blur ratio (master) is 22.6, blur ratio (itself) is a little less than 22.6, faint and scratchy ratio (master) is 4.3, and faint and scratchy ratio (itself) is 3.9, they are all in the range above and the sample seal-imprint should correspond to the registered seal-imprint. When at least one of them is but of the range, however, the sample seal-imprint in verification is not judged to correspond to the registered one.

Figure 11:
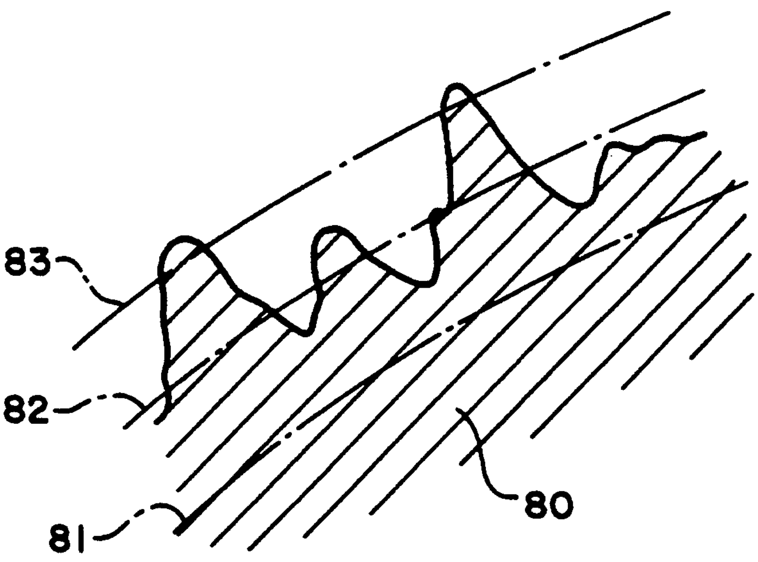
FIG. 11 shows a sample seal-imprint and registered one to be swelled.

FIG. 11 shows the periphery of an input seal-imprint. After the judgment above, the swelling blur coefficient is examined. For example as to the n-th layer in FIG. 11, assuming line 83 is adopted, the swelling blur coefficient is calculated, as shown in step S6, by adding the total number of pixels in layer 81 to 83 to the number of pixels of identification, and dividing the result by all the number of pixels in sample seal-imprint, then multiplying the result by 100. The coefficient calculates the standard deviation which shows the mean value and the distribution in every cluster and in every layer from the first to the eighth. For example, swelling blur coefficient in cluster C4 are calculated as in TABLE 2.

TABLE 2

| | Swelling Blur Coefficient Mean Value | Standard Deviation |
|---|---|---|
| 1st Layer | 93.0% | 3.6 |
| 2nd Layer | 98.8% | 1.2 |
| 3rd Layer | 99.8% | 0.4 |
| 4th Layer | 99.9% | 0.2 |
| 5th Layer | 100.0% | 0.1 |
| 6th Layer | 100.0% | 0.05 |
| 7th Layer | 100.0% | 0.02 |
| 8th Layer | 100.0% | 0.01 |

In the present embodiment, faint and scratchy coefficient in each layer in sample seal-imprint is examined to determine if it is within the range of standard values shown in TABLE 2 or not; that is, the range of standard value to be examined is (mean value of swelling blur coefficient)+−3×(standard deviation). When all swelling blur coefficient of sample seal-imprint are within the range of standard value, the sample seal-imprint is judged to correspond to the registered one. On the other hand, if at least one of swelling blur coefficients of 8 is out of the range, it is judged that there is a possibility of no correspondence between the sample seal-imprint and the registered one.

The judgment in unit 1 is completed.

The judgment in unit 2 is executed for next clustering, from area ratio in the same way as in unit 1. Characteristic values are executed if they are within the standard values: that is, identification ratios (master and itself), blur ratios (master and itself), faint and scratchy ratios (master and itself), swelling blur coefficients from the first to the eighth layer. When all of identification ratios (master and itself), blur ratios (master and itself), and faint and scratchy ratios (master and itself) are within the standard values, the sample seal-imprint is judged to be the same as the registered one. When at least one of them is out of the standard value, the sample seal-imprint is judged to be different from the registered one. On the next step, swelling blur coefficient is examined. The examination is similar to that in unit 1. When 8 of swelling blur coefficients are within the standard values, the sample seal-imprint is judged to be the same as the registered one. When at least one of them is out of the range of standard value, the sample seal-imprint is judged to be possibly different than the registered one.

Finally, the judgment is executed in unit 3, in the same way as in units 1 and 2. Clustering is carried out in 4 items of blur ratios of master and itself, and faint and scratchy ratios of master and itself. The rest of characteristics values of sample seal-imprint are examined to determine whether they are within the standard value or not: that is, area ratio, identification ratios of master and itself, and each swelling blur coefficient from the first to the eighth layer are examined. The judgment is the same as in units 1 and 2, whether sample seal-imprint corresponds to the registered one or not, and whether there is a possibility that the sample seal-imprint is quite different from the registered one.

Here, from units 1 to 3, the judgment is completed from the general view, that is, area ratio, identification ratios of master and itself, blur ratios of master and itself, faint and scratchy ratios of master and itself, and swelling blur coefficient from the first to the eighth layers for detailed standard judgment of a difference of character to construct the seal-imprint. Final judgment is executed as follows.

1. A sample seal-imprint is judged to be the same as the registered one when all judgments from units 1 to 3 are accepted (that is, the characteristics value of sample seal-imprint are within the standard values), and all the detailed judgments for differences of strokes are accepted.
2. A sample seal-imprint is judged to be the different one from the registered seal-imprint, even in the case that all of detailed standards of judgment are accepted, when at least one of general view of judgments from unit 1 to 3 is not accepted (that is, (*a*)characteristics value(s) is/are out of the range of the standard value).
3. A sample seal-imprint is judged to have the possibility of being a different seal-imprint from the registered one when at least one of detailed standards of judgment is not accepted even if all of standard of judgment from unit 1 to 3 are accepted.

Here, precise truth judgment is completed in step S7. The number of clusters used in the judgment is selected according to the judgment precision. It is described referring to FIGS. 13 and 14.

These diagrams show the relationship between blur ratio of master and faint, scratchy ratio of master in the case that a sample seal-imprint corresponds to the registered one. Each point shows the data of blur ratio and faint, scratchy ratio, and ellipse D shows clusters. The abscissa of the center point in each cluster is the mean value of blur ratio of data in the cluster, and the ordinate is the mean value of faint, scratchy ratio of data in the cluster. The size of each ellipse is decided by taking major diameter or minor diameter with the length of 3 times of standard deviation $\sigma$ in plus and minus directions in the middle of the mean value of blur ratio, and by taking major diameter or minor diameter with the length of 3 times of standard deviation $\sigma$ in plus and minus directions in the middle of the mean value of faint and scratchy ratio.

Figure 13:
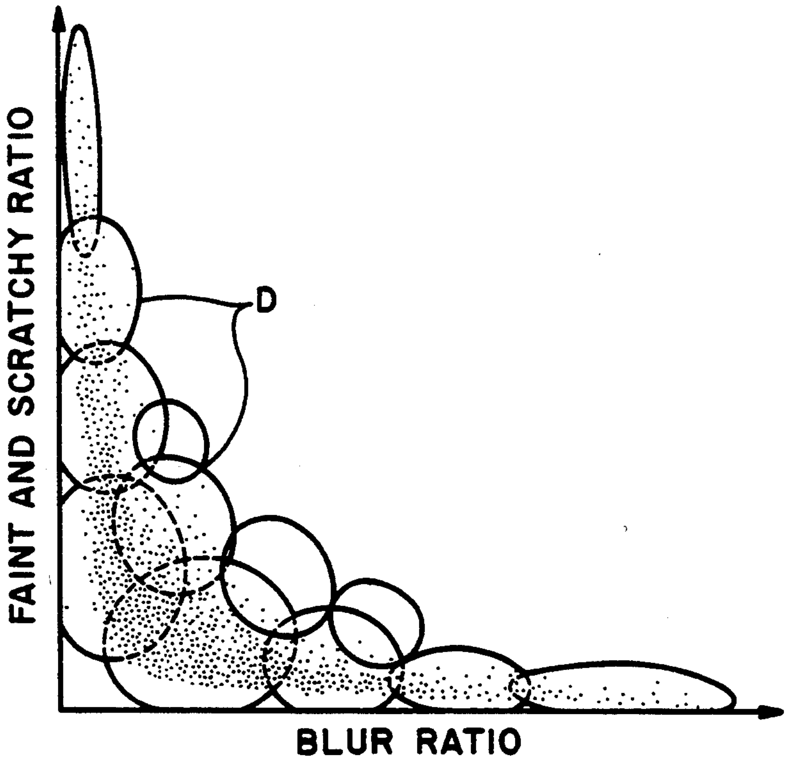
FIG. 13 shows the relationship between blur ratio and faint, scratchy ratio in the case that the number of clusters is 12.
Figure 14:
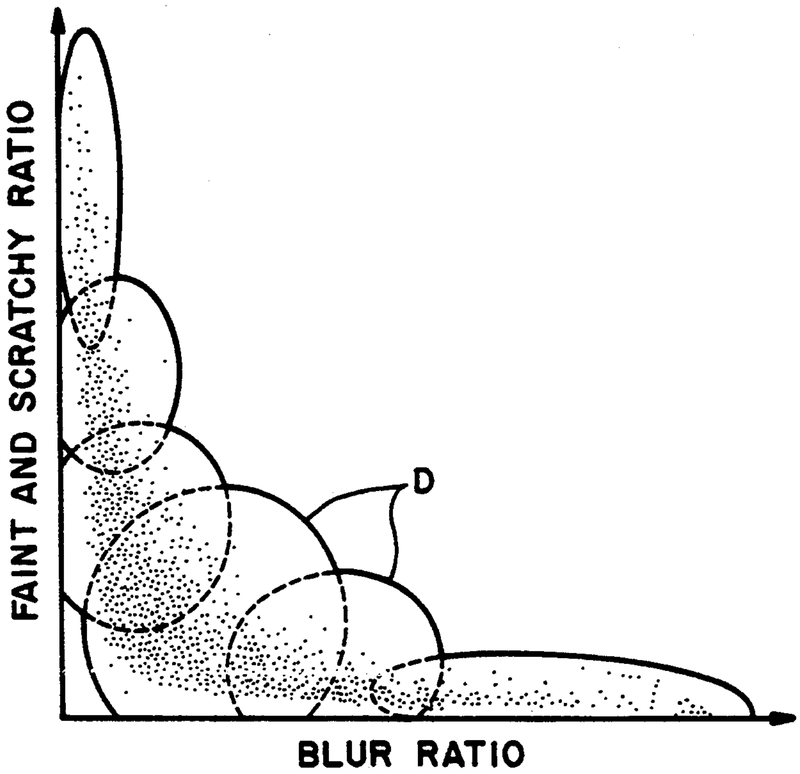
FIG. 14 shows the relationship between blur ratio and faint, scratchy ratio in the case that the number of clusters is 6.

As understood from FIGS. 13 and 14, the less the blur ratio becomes, the more the faint and scratchy ratio are, when sample seal-imprint is the same as the registered one. Comparing FIG. 13 which has twelve clusters with FIG. 14 that has six clusters, it is clear that the more the number of clusters increases, the smaller the area of a cluster becomes and as the result the narrower the area becomes to be surrounded by all the clusters. That is, the more the number of clusters, the shorter the length of major diameter and minor diameter in ellipse of each cluster. Therefore, the more the number of clusters, the more difficult the verification of seal-imprints becomes: the fewer the number of clusters, the easier the verification, because conditions for verification become looser.

VIII) Processing in Step S0

The method for obtaining the registered seal-imprint before the judgment above will now be described. This is basically the same as those in steps S1, S2, S3 and S5.

First, four (for example) clear seal-imprints are selected among a number of sealed imprints. The first seal-imprint is photographed by CCD camera by the same way in step S1. That is, it is photographed 32 times, gray-level image is obtained, which is performed by accumulating addition of 32 of the seal-imprints. An area is approximately decided by clearing image in the same way in step S2. Overlapping this area on the image obtained in step S1, the image outside of the area is deleted and the image inside of the area is binarized in the same way in step S3. Consequently, gray-level image and binarized image of the first seal-imprint are obtained.

Next, the binarized image of the second seal-imprint is obtained by executing steps S1, S2 and S3 in the same way as to the first one. This is the second processed imprint. The second binarized imprint is overlapped on the first binarized imprint and their locations are adjusted by moving rotationally or parallelly as in step S5. The gray-level image of the second seal-imprint is moved with the angle and length obtained here on the gray-level image of the first seal-imprint.

In all the same way of the second seal-imprint above, the gray-level images of the third and the fourth seal-imprint are overlapped on the gray-level of the first seal-imprint sequentially.

Here, the locations of the gray-level images from the first to the fourth seal-imprints are adjusted each other: the one obtained in such a way is the gray-level image of the registered seal-imprint. The binarized image of the registered seal-imprint is obtained by performing from step S2 to step S3. The present binarized one is the standard to verify sample seal-imprints.

In this embodiment, the number of overlapped seal-imprints is 4: any number will do in practical use.

The numerals used in the description of above embodiment are examples.

As mentioned above, the present invention makes it possible to adjust locations of sample seal-imprint and registered imprints in a short time. Consequently, it becomes possible to shorten the time for verifying seal-imprints.

As mentioned above, it is possible to judge precisely image verifications and reduce the frequency of manual human judgment by the present invention.

What is claimed is:

1. A method of establishing a coincidence between two images, comprising the steps of:

processing a registered image and a sample image so as to establish at least one circle within each of the respective images, and to determine values of individual pixels which intersect with said at least one circle;

rotating one of said sample and registered image and determining values of individual pixels on said at least one circle again in the rotated image;

determining a rotated position of the rotated image which gives a maximum correspondence between values of corresponding individual pixels intersecting said at least one circle of each of said registered and sample images; and establishing said rotated position of said maximum correspondence as a proper coincidence position between the two images.

2. A method as in claim 1, comprising the further step of establishing two circles within each of the respective images including an inner circle and an outer circle, and said two circles are concentric to one another, said determination of said rotated position of said maximum correspondence being made between corresponding individual pixels on said inner circle of each of said sample and stored image, as well as being made between corresponding individual pixels on said outer circle of each of said sample and stored images.

3. A method as in claim 2 wherein when said position of maximum correspondence between corresponding individual pixels on the outer circle of each of said sample and stored image is different than said position of maximum correspondence between corresponding individual pixels on the inner circle of each of said sample and stored image, the position of maximum correspondence with the smaller difference between registered and sample images is established as said proper coincidence position.

4. A method as in claim 1 wherein said images are substantially round images 5. A system for establishing a coincidence point between two images, comprising:

means for processing a registered image and a sample image to establish at least one circle within each respective image, and to determine values of individual pixels which intersect with said at least one circle;

means for rotating one of said sample and registered image and determining values of individual pixels on said at least one circle again in the rotated image; and means for determining a rotated position of the rotated image which gives a maximum correspondence between corresponding individual pixels on said at least one circle of each of said registered and sample image, and for establishing a position of said maximum correspondence as a proper coincidence position between the two images.

* * * * *